No. 755,704. PATENTED MAR. 29, 1904.
E. M. SANGER.
BEARING FOR VERTICAL SHAFTS.
APPLICATION FILED JUNE 20, 1903.
NO MODEL.
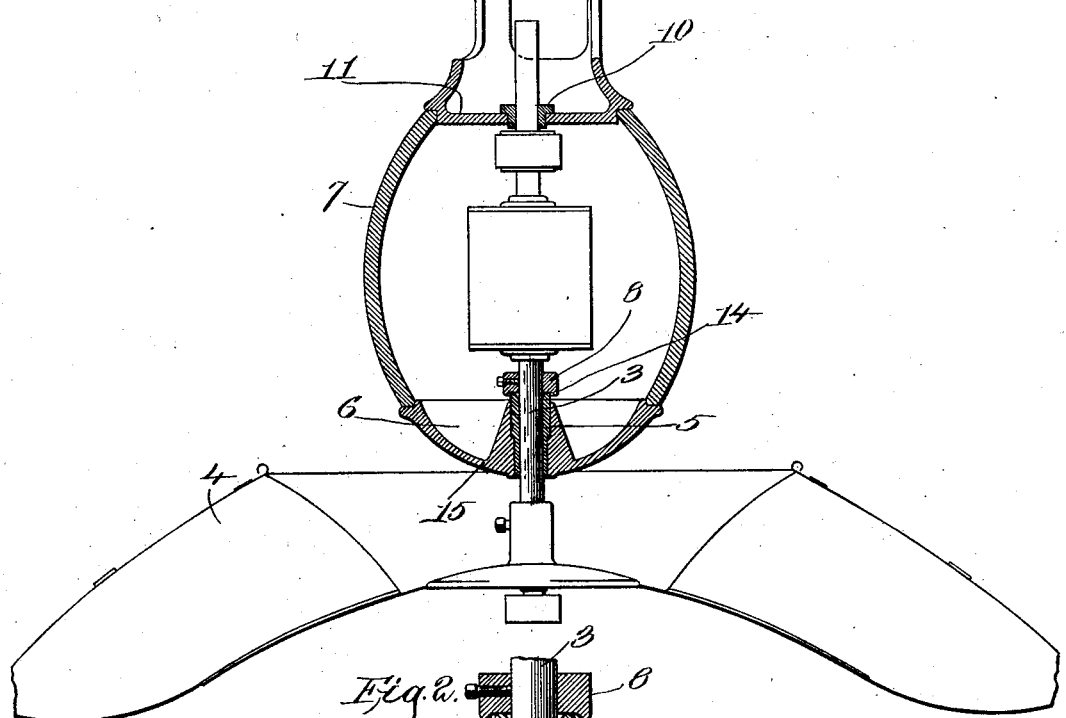
Fig. 1.
Fig. 2.
Witnesses.
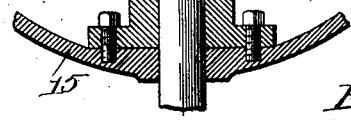
Inventor.
Eugene M. Sanger, No. 755,704. Patented March 29, 1904.

UNITED STATES PATENT OFFICE.

EUGENE M. SANGER, OF BOSTON, MASSACHUSETTS.

BEARING FOR VERTICAL SHAFTS.

SPECIFICATION forming part of Letters Patent No. 755,704, dated March 29, 1904.

Application filed June 20, 1903. Serial No. 162,313. (No model.)

*To all whom it may concern:*

Be it known that I, EUGENE M. SANGER, a citizen of the United States, residing at Boston, in the county of Suffolk and State of Massachusetts, have invented an Improvement in Bearings for Vertical Shafts, of which the following description, in connection with the accompanying drawings, is a specification, like numerals on the drawings representing like parts.

This invention relates to bearings for vertical shafts, and has for its object to provide a self-lubricating insulated bearing of this class which is simple in construction and inexpensive to manufacture and which is especially adapted for use in electric ceiling-fans. The invention, however, is not limited to use in a fan, as it is of such a nature that it may be used in other relations. The bearing comprises a supporting-sleeve of self-lubricating insulating material, through which the shaft passes and on the upper edge of which rests a collar or flange rigid with the shaft and a centering-sleeve of similar material for holding the shaft in its upright position.

In the drawings, Figure 1 shows a vertical section through a ceiling-fan having my invention applied thereto, and Fig. 2 is a modification.

The vertical shaft which is to be supported in my improved bearings is designated by 3, and in the embodiment of the invention herein shown said shaft is the vertical armature-shaft of an electric motor and has secured at its lower end a suitable fan 4.

The shaft passes through and is supported by a supporting-bushing 5 of some suitable insulating self-lubricating material—such, for instance, as wood, which has been thoroughly impregnated with oil. This bushing or sleeve 5 may be supported in various ways, depending upon the particular type of structure to which my improved bearings are applied. In the present embodiment of my invention it is supported in the lower head 6 of the motor-casing 7, which is suspended from the ceiling in any appropriate way.

Rigid with the shaft 3 is a collar or flange 8, which rests upon the upper edge of the sleeve 5. This collar may be either integral with the shaft 3 or a separate collar rigidly secured thereto, as shown in the drawings. The upper end of the shaft 3 passes through and is centered by a sleeve 10, also of some suitable self-lubricating insulating material. In this embodiment of my invention this centering-sleeve 10 is supported by the upper head 11 of the motor-casing.

The character of the material of which the sleeves 10 and 5 are made is such that no lubrication of the bearings is required, and consequently when the invention is used in an electric fan the fan may run continuously throughout the season without the necessity of any attention whatever so far as lubrication is concerned. Furthermore, the arrangement is such that the shaft 3 comes in contact with no other portion of the structure except the sleeves 10 and 5, and as these sleeves are made from insulating material the shaft becomes thoroughly insulated.

I prefer to make the upper edge of the sleeve 5 slightly rounding, as shown, and also to provide the collar 8 with the apron or annular flange 14, which overlaps the upper edge of the sleeve somewhat. This flange constitutes a guard to prevent the dust from working into the bearing.

The sleeve 3 must be supported against lateral strains in some suitable way, and in Fig. 1 I have accomplished this by providing the lower head 6 of the motor-casing with the annular reinforcing-flange 15, which surrounds the sleeve 5 and into which said sleeve is supported. This necessary reinforcing of the sleeve 5 may be accomplished, however, by making the material of the sleeve thick enough to give it the necessary rigidity, as shown in Fig. 2. In this form of the invention the reinforcing wall or hub 15 is not necessary, and the sleeve may be secured to its support in any suitable way. I have not deemed it necessary to illustrate the motor in full and have therefore omitted the field-magnets in order not to confuse the drawings.

While the invention is herein shown as applied to a vertical fan, I wish it understood that it may be used in other relations wherever it is desired to support a vertical shaft.

Various changes may be made in the details of construction without departing from the spirit of the invention.

Having described my invention, what I claim as new, and desire to secure by Letters Patent, is—

In a bearing for vertical shafts, a supporting-sleeve of self-lubricating material through which the shaft extends, a collar or flange rigid with the shaft and resting upon the upper edge of said sleeve, whereby the latter supports the entire weight of the shaft and a centering-sleeve of similar material through which the shaft projects and by which it is centered.

In testimony whereof I have signed my name to this specification in the presence of two subscribing witnesses.

EUGENE M. SANGER.

Witnesses:
LOUIS C. SMITH,
JOHN C. EDWARDS.